United States Patent [19]
Rote et al.

[11] 3,960,546
[45] June 1, 1976

[54] METHOD FOR ELIMINATING NOSE-SKULLS FROM STEELMAKING VESSELS

[75] Inventors: Franklin E. Rote, Peoria, Ill.; Karl Brotzmann, Sulzbach-Rosenberg, Germany

[73] Assignee: United States Steel Corporation, Pittsburgh, Pa.

[22] Filed: May 22, 1974

[21] Appl. No.: 472,245

[52] U.S. Cl. .......................................... 75/60; 75/59
[51] Int. Cl.² ........................ C21C 5/32; C21C 5/34
[58] Field of Search ............................... 75/59, 60

[56] References Cited
UNITED STATES PATENTS

| | | |
|---|---|---|
| 2,562,813 | 7/1951 | Ogorzaly .................................. 75/60 |
| 3,854,932 | 12/1974 | Bishop .................................... 75/60 |

*Primary Examiner*—Peter D. Rosenberg
*Attorney, Agent, or Firm*—Forest C. Sexton

[57] ABSTRACT

Nose-skulls which normally form in the nose section of steelmaking vessels such as the bottom-blown oxygen steelmaking vessel, are prevented from forming, or are removed after forming, by injecting oxygen into the vessel nose section to oxidize either the carbon monoxide gases formed by the steelmaking reaction, or a combustible fluid injected simultaneously with the oxygen, or bath.

28 Claims, 3 Drawing Figures

METHOD FOR ELIMINATING NOSE-SKULLS FROM STEELMAKING VESSELS

BACKGROUND OF THE INVENTION

A relatively new process for making steel, the bottom-blown oxygen steelmaking process developed in Germany, is beginning to receive considerable attention in the United States. This new process has decided advantages over the conventional open hearth process, and even the more recent top-blown basic oxygen process (BOP process) which is currently replacing many open hearth shops. Like the more conventional BOP process, the new bottom-blown oxygen process is a basic process utilizing a combination of an oxygen blow and a lime-containing basic slag to remove the impurities from the molten iron. Unlike the BOP process, however, the bottom-blown oxygen process blows oxygen through tuyeres extending through the vessel refractory lining below the molten metal surface. Each oxygen tuyere is substantially flush with the surface of the vessel refractory lining and is surrounded by a larger concentric tuyere for the simultaneous injection of a protective jacket fluid such as natural gas, propane or other gaseous or liquid hydrocarbons, or at least a fluid containing such hydrocarbons. The hydrocarbon jacket fluid acts in part as a shield between the oxygen or molten metal upon initial emergence into the metal bath thereby momentarily delaying oxidation reactions to prevent rapid errosion of the tuyeres and adjacent refractory material. In addition, the jacket fluid acts as a super-coolant, endothermically dissociating upon contact with the hot molten metal, thereby preventing the rapid increase in temperature that would otherwise result from the oxidation reactions.

Both the BOP and the bottom-blown oxygen processes share a common disadvantage of producing nose-skulls, i.e. build-up of solid material, metal and slag, in the mouth or nose portion of the vessel which eventually restrict the vessel opening and interfere with satisfactory operation of the vessel. Although many mechanical devices have been developed for "deskulling" BOP vessels these are not suitable for bottom-blown oxygen vessels because the nature of the two skulls are quite different. Whereas the BOP skull typically consists mostly of slag, and is therefore friable and easily broken away from the vessel, skulls formed on bottom-blown oxygen vessels are mostly metallic and are very difficult to remove. To remove these nose-skulls, furnace operations are halted, and the skulls torch-cut into pieces and usually recharged as scrap. Because the skulls formed on bottom-blown oxygen vessels are predominately metallic, and form rather quickly, the formation of such skulls does measurably lower metallic yield. In addition, skull removal does often cause damage to the vessel refractories, which must be patched before resuming operation.

SUMMARY OF THE INVENTION

An object of this invention is to provide a method for preventing the formation of nose-skulls on upright steelmaking vessels such as BOP vessels and particularly bottom-blown oxygen vessels.

Another object of this invention is to provide a method for ". . . removing . . ." nose-skulls on upright steelmaking vessels such as BOP vessels and particularly bottom-blown oxygen vessels.

Another object of this invention is to provide apparatus for preventing the formation of nose-skulls on upright steelmaking vessels.

Another object of this invention is to provide apparatus ". . . removing . . ." nose-skulls on upright steelmaking vessels.

A further object of this invention is to provide a bottom-blown oxygen steelmaking vessel having at least one nose tuyere for heating the nose portion of the vessel to prevent the formation of nose-skulls thereon, or to remove nose-skulls after they are formed.

DESCRIPTION OF THE PREFERRED EMBODIMENT

Figure 1:
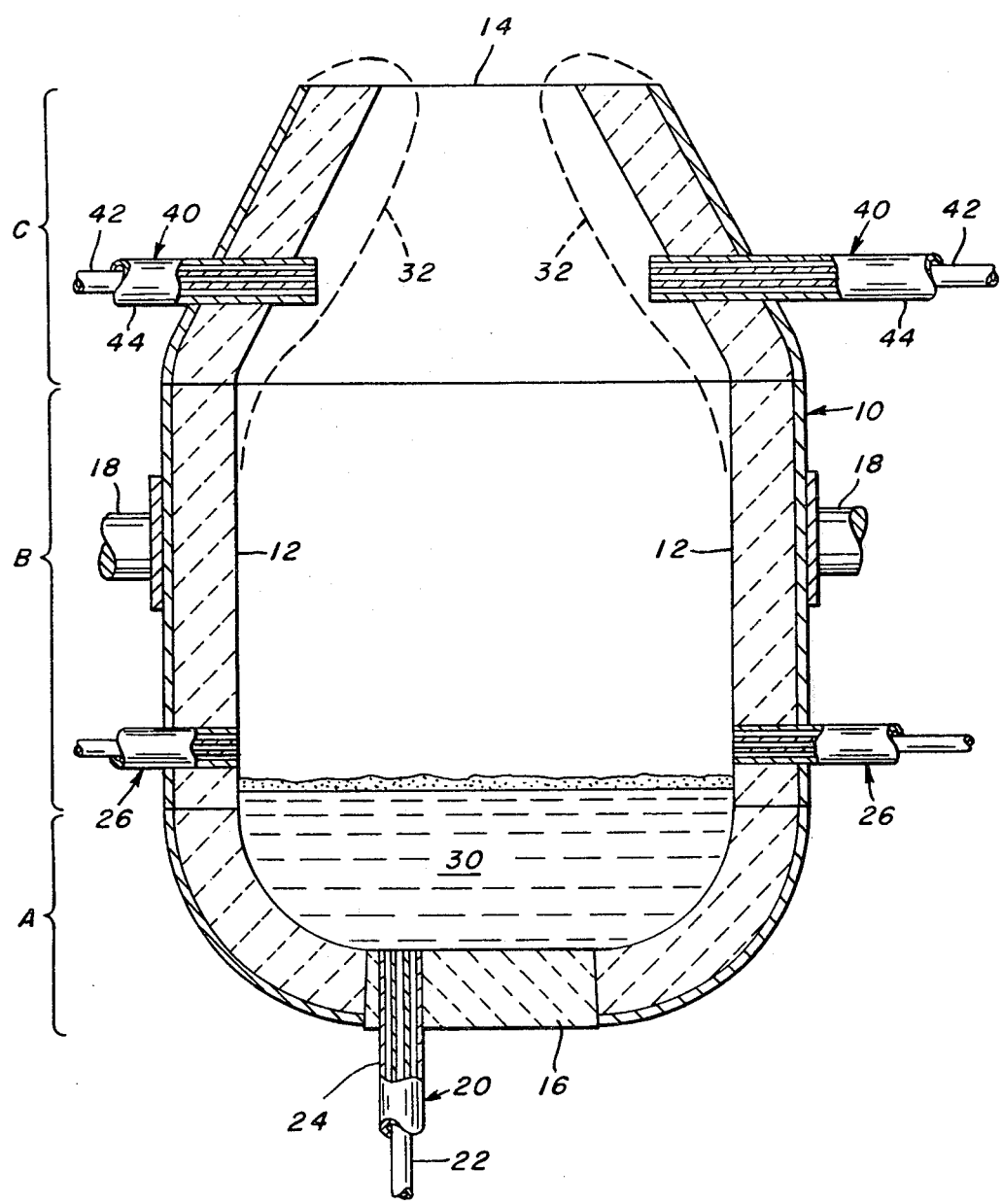
FIG. 1 schematically illustrates one embodiment of this invention showing a sectional elevation of a typical bottom-blown steelmaking vessel incorporating a pair of nose tuyeres.

With reference to the attached drawing, a typical bottom-blown oxygen steelmaking vessel comprises a metallic shell 10, having a refractory lining 12 on the inside thereof, a mouth or opening 14 on the top and a refractory bottom plug 16 at the base. The vessel can be thought of as comprising three main sections, the bottom section A, the barrel section B and the nose section C. The entire vessel is tiltable about the axis of trunnion 18 (shown only in part). The bottom plug 16 is provided with at least one tuyere 20 extending upwardly therethrough consisting of a central pipe 22 for admitting oxygen and a concentric pipe 24 for admitting the jacket fluid. Some bottom-blown oxygen steelmaking vessels are also provided with one or more side tuyeres 26 which are intended primarily for adding oxygen to the furnace atomsphere just above the slag surface of oxidizing carbon monoxide off-gas to yield more heat.

In operation, the oxygen injected into the molten metal 30 refines the metal to steel by oxidating impurities therefrom. A more detailed description of the operation of the bottom-blown oxygen steelmaking process can be found in U.S. Pat. No. 3,706,549, Knuppel et al. Because the tuyere or tuyeres 20 are below the surface of the metal 30, the blowing operation does cause considerable turbulence in the metal 30 resulting in substantial spitting whereby molten particles of metal and slag are thrown upward into the cooler nose section C of the vessel. Those particles which come into contact with the refractory lining 12 in the nose section C will usually solidify in place and accumulate to form a sizable nose-skull after only a few heats. Dotted lines 32, illustrate the outline of a typical nose-skull. As noted above, these nose skulls are primarily metallic in composition, and hence reduce the metallic recovery in each heat. More significant however is the fact that such nose-skulls do interfere with efficient operation of the vessel, restricting the size of mouth 14 to complicate charging operations and frequently interfering with the off-gas duct-work closely positioned above the vessel. As already noted, this nose-skull, being primarily metallic, is rather difficult to remove.

The crux of this invention resides in providing a means, such as tuyeres 40, for injecting oxygen or an oxygen containing gas, into the vessel nose section C, which will oxidize either the already present combustable gases such as carbon monoxide emerging from the molten metal below, or an injected combustible fuel such as natural gas, propane or fuel oil, or bath. Although the means for injecting the oxygen may take any suitable form, such as a simple lance inserted through the vessel mouth 14, a preferred means is to provide at least one, and preferably two, nose tuyeres 40 through the vessel wall at nose section C, substantially as shown in the drawings. Although one such tuyere 40 will suffice and be effective, two tuyeres 40 are preferred for a more uniform heat distribution, preferably positioned diametrically opposed above the vessel trunnions 18 as shown. Although more than two such tuyeres would also be effective, this is not necessary for optimum operation, and may in fact be disadvantageous in that more than two tuyeres 40 may interfere with vessel charging or tapping. The use of two tuyeres 40 positioned one each over the vessel trunnions 18 is preferred so that the tuyeres 40 are not submerged in hot molten metal when the vessel is turned-down for charging, sampling or tapping. Although tuyeres 40 do not prevent turbulence and spitting of metal particles, tuyeres 40 do serve to maintain a higher temperature in nose section C of the vessel so that metallic and slag particles thrown against the refractory walls therein will not solidify thereon, but will fall back down into the molten bath below.

Tuyeres 40 may be provided in several different forms. As shown, the preferred form for tuyeres 40 is to utilize a double-pipe construction substantially as used for tuyeres 20, wherein oxygen, air or an oxygen containing gas is injected through the central pipe 42 and a combustible coolant fluid such as natural gas, propane or fuel oil is injected through the concentric pipe 44. The combustible coolant fluid so injected will serve first as a localized coolant, endothermically dissociating upon emergence from the tuyeres 40 to prevent the tips thereof from overheating thereby substantially prolonging tuyere life. Thereafter the combustible coolant, or rather the dissociation products therefrom, consisting primarily of carbon monoxide and hydrogen, will serve as a fuel which are oxidized to provide heat as desired to prevent nose-skulls.

As an alternative and simpler form in some operations, tuyeres 40 may consist merely of single pipes (not shown) for the injection of only oxygen or an oxygen containing gas. That is to say, a combustible fluid is not in fact necessary in most operations because the off-gases emerging from the molten metal 30 usually contain appreciable amounts of carbon monoxide which will burn to carbon dioxide in the nose section C in the presence of injected oxygen. Hence, all that is absolutely necessary to appreciate the advantages of this invention is that an oxygen containing gas be injected into the nose section C of the vessel to therein burn the carbon monoxide in the process off-gases thereby heating the refractory lining 12 in the nose section C sufficiently to prevent metal and slag particles from solidifying thereon. This embodiment however exhibits one disadvantage in that a large amount of heat is concentrated at the tuyere tip which will appreciably shorten the life of the tuyere.

Although a single pipe tuyere or lance can be used for the purposes of this invention, it has already been noted that tuyeres of a double-tube construction be utilized, so that the combustible coolant fluid can be used to cool the tuyere tip, and to provide greater heat input capabilities by oxidation of the coolant dissociation products. The double-tube construction may be particularly desirable for use on those bottom-blown steelmaking vessels having side tuyeres 26, as shown in FIG. 1, which may burn appreciable amounts of carbon monoxide in the vessel barrel section B. In addition, the use of combustible fluids injected via tuyeres 40 will allow heat input to the vessel nose section C during periods when no carbon monoxide gases are present, e.g. when the vessel is empty between heats, or when argon or nitrogen are being blown through tuyeres 20. To clarify this latter point, it is common practice to blow nitrogen gas through the bottom tuyeres 20 during charging to prevent the tuyeres 20 from being plugged. The ability to provide constant heat input to the vessel nose section C is not however essential as the tuyeres 40 may be used only intermittantly as desired. That is to say, it has been shown that the tuyeres 40 may be maintained inactive for lengthy periods of time even to the point where a sizable nose skull is allowed to form, and thereafter activation of tuyeres 40 will burn-off any such nose skull.

Figure 2:
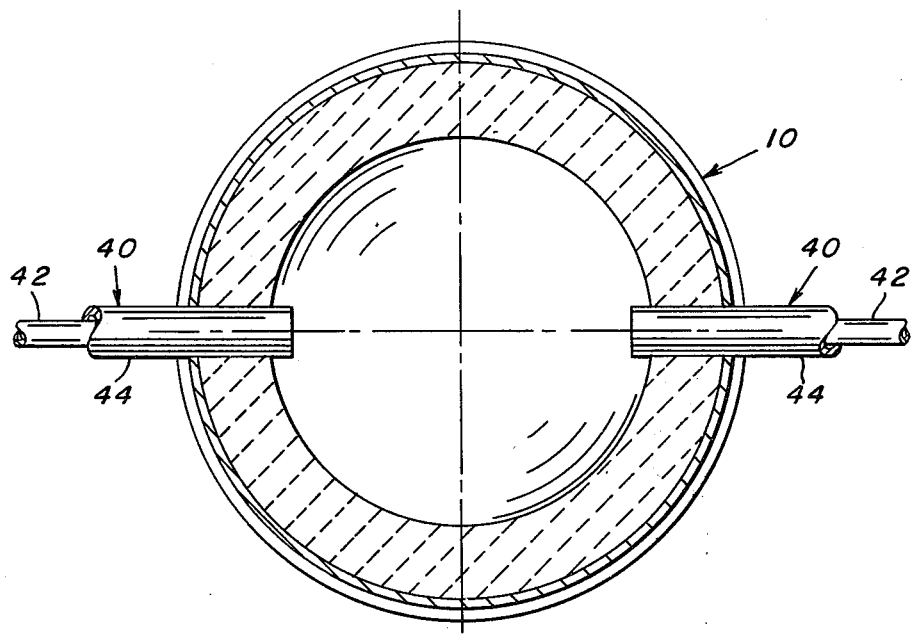
FIG. 2 schematically shows a top view of the FIG. 1 illustration in section at line II—II.
Figure 3:
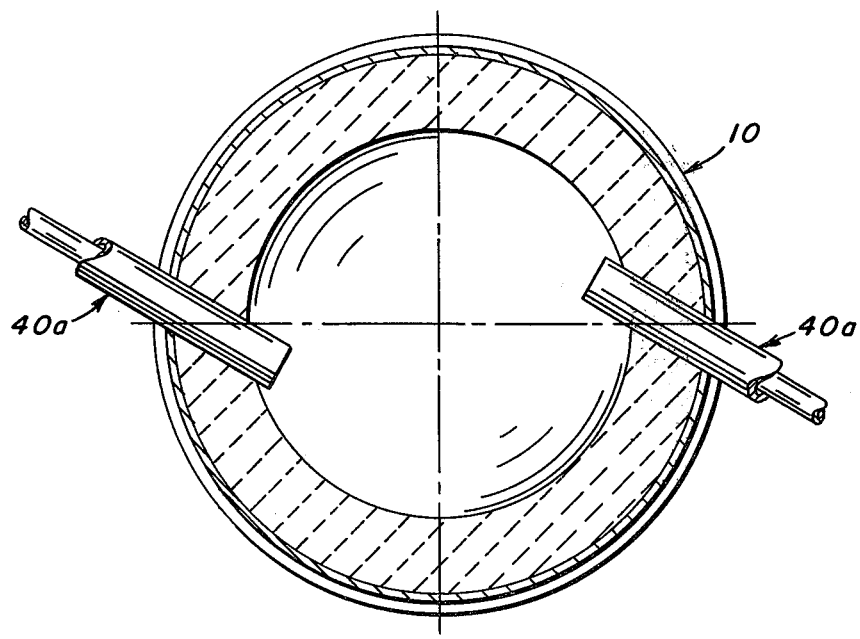
FIG. 3 is the same as FIG. 2 except that the tuyeres are slightly angled from the vessel axis illustrating a second embodiment.

It was noted above two tuyeres 40 are preferred, diametrically opposed through the walls of the vessel nose section C, directly above each trunnion 18. The specific placement of the tuyeres 40 on nose section C is not particularly critical, although the position above the trunnions 18 is preferred so that the tuyeres 40 are not submerged in molten metal when the vessel is tilted. In addition, a position relatively low on the vessel nose section C, close to the barrel section B, is preferred in view of the upward motion of the emerging gases. In the event obstructions necessitate placement of the tuyeres 40 relatively high on nose section C, it is advisable to angle the tuyeres downward so that the heat generated thereby is not concentrated above the vessel. On particularly large vessels, diametrically opposed tuyeres 40 blowing towards the vessel axis, as shown in FIG. 2, may result in inadequate heating of the nose section refractory walls 90 degrees around the vessel between tuyeres 40. This can be overcome by positioning the two tuyeres at a slight angle to the vessel radius as shown in FIG. 3. This will cause a circular gas motion which can better heat the refractory walls most distant between the tuyeres.

In operation, oxygen is injected through pipe 42 in tuyere 40 at a predetermined rate depending upon the desired heat input, and the amount of oxidizable gases available for burning. Simultaneously, the combustible coolant is injected through pipe 44 on tuyere 40 at a predetermined rate depending upon the coolant gas. If natural gas is used as the coolant, the preferred rate thereof is from about 7 to about 12% of the oxygen rate. Natural gas rates below about 7% will not normally provide sufficient cooling effect to prevent excessive tuyere burn-back, whereas rates above about 12% may tend to overcool the tuyere tip, which may cause it to become plugged by metal and slag thrown thereagainst. It may be noted that this oxygen to natural gas ratio is substantially the equivalent to the gases and ratios typically blown through the bottom tuyeres of a bottom-blown oxygen steelmaking vessel. In applications utilizing a bottom-blown oxygen steelmaking vessel therefore, the nose-tuyeres of this invention can be directly fed from the system feeding the bottom tuyeres, and whatever gases and ratios are fed through the bottom tuyeres will also be fed through the nose-tuyeres.

As noted above, it may not be necessary to operate tuyeres 40 at all times, as the tuyeres can be used intermittently to remove accumulated nose-skull. Is is advisable however, to keep some gas going through the tuyeres during the refining operation in order to keep them open. On the other hand, it may also be advisable to avoid complete burn-off of nose-skull, since a small amount of nose-skull accumulation is in fact desirable to protect the refractories therebeneath. Therefore, intermittent operation of the tuyeres 40, on at least a lower than maximum heat input is desired if necessary to allow a small amount of nose-skull to allow a small amount of nose-skull to remain in the vessel nose section C.

In view of the above considerations, it is apparent that there is considerable variation in how the tuyeres 40 may be utilized since all that is necessary is that sufficient heat be supplied in the vessel nose section C to either prevent the formation of a large nose skull, or periodically burn-off accumulated nose skull. In either event, the necessary heat may be supplied by burning either carbon monoxide formed in the molten metal 30, burning a combustible fluid injected through tuyeres 40, or both. In addition, utilization of side tuyeres such as tuyeres 26 may be used to burn a portion of the carbon monoxide in the vessel barrel section B, for example to assist in scrap melting, thus permitting the other portion of the carbon monoxide to be burned in the nose section C by oxygen injected via tuyeres 40; or tuyeres 26 may burn substantially all of the carbon monoxide in the vessel barrel section B, necessitating injection of a combustible fluid via tuyeres 40 for heating purposes. Ideally, a combination of the above alternatives should be used as furnace conditions dictate to optimize overall furnace operation. For example, in a cold furnace, it may be desirable to inject as much oxygen as necessary via tuyeres 26 to burn substantially all the carbon monoxide emerging from metal 30, thereby providing maximum heat input to melt scrap, and at the same time injecting oxygen and a combustible fluid via tuyeres 40 to heat the vessel nose section C to prevent nose-skull accumulation. When the scrap is melted, the oxygen injected via tuyeres 26 may be reduced to an amount insufficient to burn all of the emerging carbon monoxide, thereby permitting the burning thereof in the vessel nose section C with a comperable decrease in the injection rate of combustible fluid via tuyeres 40. When the vessel is sufficiently heated, nose tuyeres 40 may be used intermittently as necessary to remove accumulated nose-skulls.

In addition to the above discussed embodiments of this invention, it is obvious that other embodiments and modifications could be effectively utilized. For example, the injected gas need not be pure oxygen but must merely contain oxygen. Therefore, air instead of oxygen could be used. In addition, in those vessels where there is sufficient carbon monoxide produced in the refining reactions to produce the necessary heat, the coolant need not be combustible, and hence inert gases such as argon would be satisfactory. Furthermore, tuyeres need not be used since a lance inserted through the vessel mouth 14 would also be effective, provided gas pressures were maintained to keep the combustion reactions in the vessel nose section C. Besides these obvious modifications, it is clear that the inventive process could be utilized in other applications. That is to say, this invention could be utilized in conventional BOP steelmaking vessels as well as bottom-blown oxygen steelmaking vessels, or in any metal refining vessel wherein nose-skulls are a problem.

EXAMPLES

The following examples are presented to aid in a better understanding of this invention.

A 35-ton bottom-blown oxygen steelmaking vessel was provided with two nose tuyeres positioned 1 foot above the vessel trunnions. The nose tuyeres were of double-pipe construction using 1 inch (Schedule 40) pipe for the central oxygen inlet and 1 ¾ inch (10) pipe for the concentric combustible fluid inlet. The tuyeres extended 6 inches beyond the refractory surface inside the vessel.

To test the effectiveness of the above tuyeres, a sizable nose-skull was left on the vessel. This nose-skull, which was accumulated during two previous heats of 25 tons each, was estimated to weigh about 10,000 pounds. (It is seen that about 10% of each of the two previous heats remained in the furnace as nose-skull.)

Thereafter, a 25-ton heat of metal was refined while utilizing the nose tuyeres to the extent that 250 scfm of oxygen was blown through each tuyere with 27.5 scfm natural gas was blown through the annular of each tuyere. After blowing 17 minutes, 59 seconds, the nose-skull was nearly gone. During two subsequent heats, the natural gas flow rate was cut to 25 scfm/tuyere, and the nose-skull was completely burned away. During eight subsequent heats, the vessel nose section remained essentially free of nose-skulls by continued use of the nose tuyeres. Thereafter, the nose tuyeres were examined and no appreciable burn-back thereof could be noted. In fact, a protective cone of material had formed around the tuyeres measuring about 2 inches at the tip and 6 inches at the base.

We claim:

1. In a metal refining vessel having a hearth section to contain a molten metal charge and a nose section thereabove, wherein an oxygen containing gas is introduced into the vessel hearth section to oxidize impurities from a molten metal charge therein thereby refining the metal charge and forming gases containing carbon monoxide which pass from the vessel hearth section into the vessel nose section; the method of eliminating at least substantial nose-skull build-up in the vessel nose section comprising, injecting a second oxygen containing gas into the vessel nose section at a rate sufficient to therein oxidize at least a portion of said carbon monoxide gases and heat the vessel nose section sufficiently to melt any significant accumulated nose-skull build-up and prevent further molten particles of metal and slag from solidifying on the vessel nose section walls.

2. The method of claim 1 in which said second oxygen containing gas injected into the vessel nose section is commercially pure oxygen.

3. The method of claim 1 in which said second oxygen containing gas is injected during substantially all of the refining operation to prevent the formation of any significant nose-skull build-up.

4. The process of claim 1 in which said oxygen containing gas is injected only at intervals during the refining operation to periodically melt away significant accumulated nose-skull build-up.

5. The method of claim 1 in which said metal refining vessel is a steelmaking vessel.

6. The method of claim 1 in which said metal refining vessel is a bottom-blown oxygen steelmaking vessel.

7. The method of claim 1 in which a combustible fluid is injected into the vessel nose section simultaneously with said oxygen containing gas thereby causing said combustible fluid to burn in the presence of the oxygen containing gas and providing additional heat in said vessel nose section.

8. The method of claim 7 in which said combustible fluid is a hydrocarbon gas.

9. In a metal refining vessel having a hearth section to contain a molten metal charge and a nose section thereabove, wherein an oxygen containing gas is introduced into the vessel hearth section to oxidize impurities from a molten metal charge therein thereby refining the metal charge; the method of eliminating substantial nose-skull build-up in the vessel nose section comprising, injecting a combustible fluid into the vessel nose section simultaneously with a second oxygen containing gas, each at a rate sufficient to cause said combustible fluid to burn in the presence of the oxygen containing gas, thereby heating the vessel nose section sufficient to prevent molten particles of metal and slag from solidifying on the vessel nose section walls.

10. The method of claim 9 in which said second oxygen containing gas injected into the vessel nose section is commercially pure oxygen.

11. The method of claim 9 in which said second oxygen containing gas and said combustible fluid are injected during substantially all of the refining operation to prevent the formation of any appreciable nose-skull build-up.

12. The method of claim 9 in which said second oxygen containing gas and said combustible fluid are injected only at intervals during the refining operation to periodically melt away significant nose-skull build-up.

13. The method of claim 9 in which said second oxygen containing gas and said combustible fluid are injected prior to the refining operation to preheat the vessel nose section.

14. The method of claim 9 in which said combustible fluid is a hydrocarbon gas.

15. The method of claim 9 in which said metal refining vessel is a steelmaking vessel.

16. The method of claim 9 in which said steelmaking vessel is a bottom-blown oxygen steelmaking vessel.

17. The method of claim 16 in which said oxygen containing gas introduced into the vessel hearth section, is substantially the same as the combustible fluid and second oxygen containing gas injected into the vessel nose section.

18. The method of claim 17 in which the combustible fluid and oxygen containing gas injected into the vessel nose section and combustible fluid and oxygen containing gas introduced into the vessel hearth section are supplied from a common source with common controls.

19. In a steel refining vessel having a hearth section to contain a molten iron charge and a nose section thereabove, wherein an oxygen containing gas is blown into a molten iron charge through tuyeres below the surface of said molten iron charge to oxidize impurities from said charge thereby refining the metal charge and forming gases containing carbon monoxide which emerge from said charge, and wherein a second oxygen containing gas is injected into the vessel just above the molten iron charge to burn at least some of the carbon monoxide emerging from said charge; the method of eliminating at least substantial nose-skull build-up in the vessel nose section comprising, injecting said second oxygen containing gas at a rate insufficient to burn all of the emerging carbon monoxide, and injecting a third oxygen containing gas into the vessel nose section to therein oxidize at least a portion of the carbon monoxide gases not burned by said second oxygen containing gas and at a rate sufficient to heat the vessel nose section to melt any significant accumulated nose-skull build-up and prevent further molten particles of iron and slag from solidifying on the vessel nose section walls.

20. The method of claim 19 in which said third oxygen containing gas is commercially pure oxygen.

21. The method of claim 19 in which said third oxygen containing gas is injected during substantially all of the refining operation to prevent the formation of any significant nose-skull build-up.

22. The method of claim 19 in which said third oxygen containing gas is injected only at intervals, to periodically melt away significant accumulated nose-skull build-up.

23. In a steel refining vessel having a hearth section to contain a molten iron charge and a nose section thereabove, wherein an oxygen containing gas is introduced into the vessel hearth section to oxidize impurities from a molten iron charge therein thereby forming gases containing carbon monoxide which emerge from the molten iron charge and pass into the vessel nose section; the method of eliminating substantial nose-skull build-up in the vessel nose section comprising; providing at least one concentric double-pipe tuyere through the vessel nose section wall having a central pipe and a concentric pipe therearound, injecting a second oxygen containing gas into the vessel nose section through said central pipe, and injecting a coolant fluid into the vessel nose section through said concentric pipe, said second oxygen containing gas being injected at a rate sufficient to oxidize at least a portion of the carbon monoxide and heat the vessel nose section sufficiently to melt away significant accumulated nose-skull build-up and prevent further molten particles of iron and slag from solidifying on the vessel nose section walls.

24. The method of claim 23 in which said second oxygen containing gas and coolant fluid are injected during substantially all of the refining operation to prevent the formation of any significant nose-skull build-up.

25. The method of claim 23 in which said oxygen containing gas and coolant fluid are injected only at intervals to periodically melt away significant accumulated nose-skull build-up.

26. The method of claim 23 in which said second oxygen containing gas is commercially pure oxygen and said coolant fluid comprises a hydrocarbon.

27. The method of claim 24 in which said hydrocarbon is natural gas.

28. The method of claim 27 in which said natural gas is injected at a rate of about 7% to about 12% of the oxygen injection rate.

* * * * *